(No Model.)

D. M. PETERS.
BICYCLE BRAKE.

No. 592,254. Patented Oct. 26, 1897.

WITNESSES:
P. F. Nagle.
L. Douville.

INVENTOR
Daniel M. Peters
BY John A. Biesenthein
ATTORNEY.

THE NORRIS PETERS CO., PHOTO-LITHO., WASHINGTON, D. C.

UNITED STATES PATENT OFFICE.

DANIEL M. PETERS, OF BELLWOOD, PENNSYLVANIA.

BICYCLE-BRAKE.

SPECIFICATION forming part of Letters Patent No. 592,254, dated October 26, 1897.

Application filed November 10, 1896. Serial No. 611,613. (No model.)

*To all whom it may concern:*

Be it known that I, DANIEL M. PETERS, a citizen of the United States, residing at Bellwood, in the county of Blair, State of Pennsylvania, have invented a new and useful Improvement in Bicycle-Brakes, which improvement is fully set forth in the following specification and accompanying drawings.

My invention consists of a novel bicycle-brake formed of the parts combined and arranged as hereinafter described and claimed.

Figure 3:
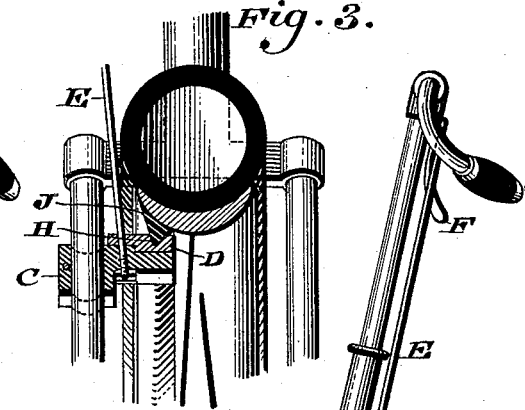
Figure 1:
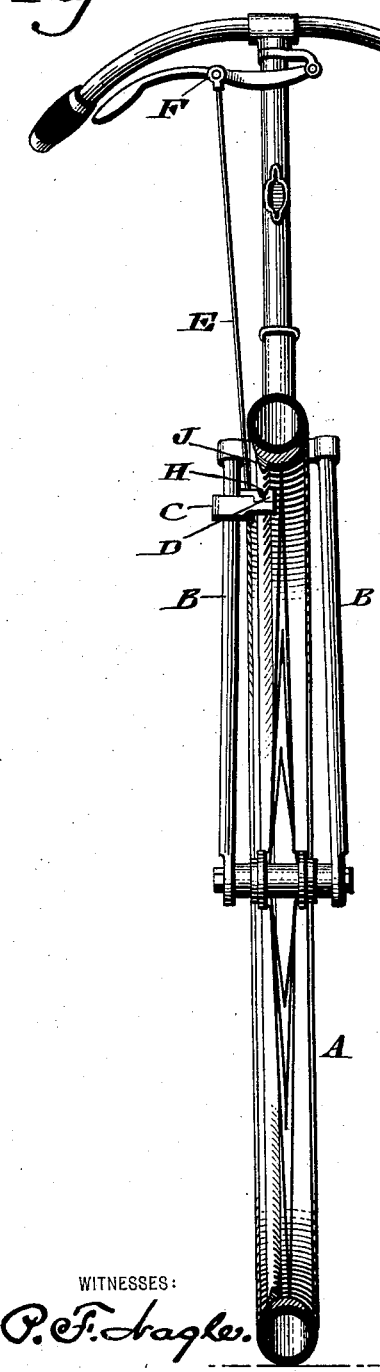
Figure 2:
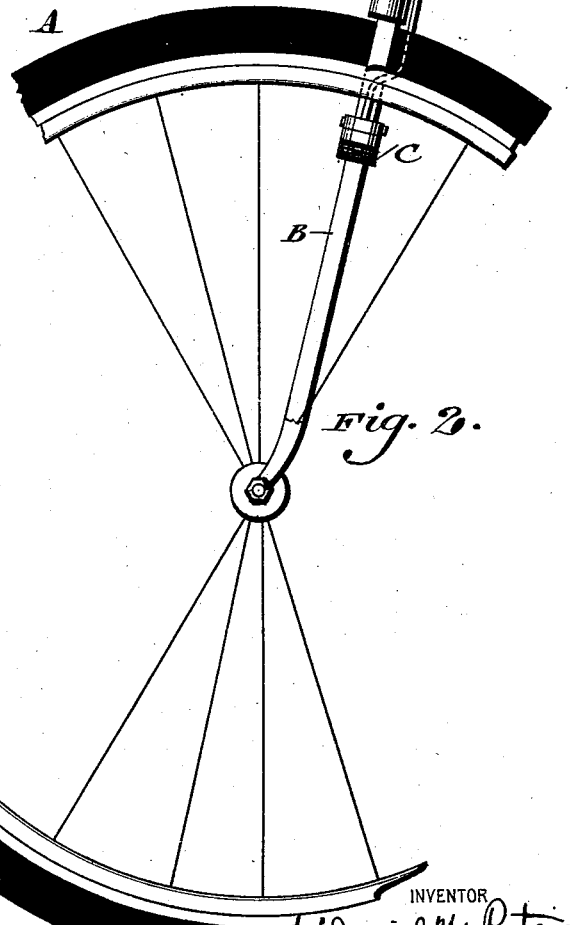

Figure 1 represents a front view of a portion of a bicycle having a brake embodying my invention applied thereto. Fig. 2 represents a side elevation thereof. Fig. 3 represents a vertical section of a portion on an enlarged scale.

Similar letters of reference indicate corresponding parts in the several figures.

Referring to the drawings, A designates one of the wheels of a bicycle, and B the fork thereof. On one of the limbs of said fork is the vertically-moving brake-head C, to which is secured the shoe D, and with which is connected the rod E, the latter being pivotally attached to the lever F, which is convenient of access from either handle of the bicycle, so that by the operation of said handle the brake-head, and consequently the shoe, may be raised and lowered, it being noticed that said shoe projects laterally from the head, so as to enter the space within the inner periphery of the felly of the wheel, and thus be moved to and from said periphery.

J designates a ring or band which is secured to the wheel at the inner periphery thereof, and so disposed in relation to the shoe D that when the latter is raised it will come in contact with said band, the brake thus being applied, the effect of which is evident. In order to increase the holding action of the shoe on the band J, the former has a recess H in its upper face, and the adjacent periphery of the band is tapering or pointed, so as to enter the recess of the shoe, or the band may be recessed and the shoe pointed, so as in either case to provide increased friction between the parts and cause the action of the brake to be effective.

Having thus described my invention, what I claim as new, and desire to secure by Letters Patent, is—

1. A bicycle steering-fork, a brake-head vertically movable on one of the limbs of said fork, a shoe secured to said head and having a recess in its upper face, a tire having a circumferential bead on its inner face adapted to be engaged by said shoe, a lever pivoted to the steering-bar and a rod pivotally connected with said head and said lever.

2. A bicycle steering-fork having a head, vertically movable on one of its limbs and extending inwardly beneath the tire of the wheel, a shoe on the upper surface of said head having a recessed face, a bead on the inner periphery of said tire adapted to be engaged by said shoe and mechanism connected with said head and fork for operating said head.

DANIEL M. PETERS.

Witnesses:
D. F. ROSEN,
R. H. VANDEVANDER.